US009752679B2

(12) United States Patent
Urac et al.

(10) Patent No.: US 9,752,679 B2
(45) Date of Patent: Sep. 5, 2017

(54) DUAL PRE-LOAD CYLINDRICAL SEAL

(71) Applicant: PRATT & WHITNEY CANADA CORP., Longueuil (CA)

(72) Inventors: Tibor Urac, Mississauga (CA); Bernard Chow, Mississauga (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 113 days.

(21) Appl. No.: 14/673,937

(22) Filed: Mar. 31, 2015

(65) Prior Publication Data

US 2016/0290506 A1 Oct. 6, 2016

(51) Int. Cl.

| | |
|---|---|
| ***F16J 15/56*** | (2006.01) |
| ***F16J 9/12*** | (2006.01) |
| ***F16J 15/32*** | (2016.01) |
| ***F16J 9/06*** | (2006.01) |
| *F16J 15/3208* | (2016.01) |

(52) U.S. Cl.

CPC ................. *F16J 9/06* (2013.01); *F16J 15/56* (2013.01); *F16J 9/12* (2013.01); *F16J 15/3208* (2013.01)

(58) Field of Classification Search

CPC ........ F16J 9/06; F16J 9/12; F16J 9/145; F16J 15/3208; F16J 15/56

See application file for complete search history.

(56) References Cited

U.S. PATENT DOCUMENTS

| | | | | |
|---|---|---|---|---|
| 1,204,024 A * | 11/1916 | Johnson | F16J 9/06 | 277/473 |
| 1,267,169 A * | 5/1918 | Bales | F16J 9/06 | 277/473 |
| 1,278,316 A * | 9/1918 | Duchesne | F16J 9/06 | 277/473 |
| 1,413,922 A * | 4/1922 | Marshall | F16J 9/06 | 277/472 |
| 1,413,923 A * | 4/1922 | Marshall | F16J 9/06 | 277/473 |
| 1,489,464 A * | 4/1924 | Small | F16J 9/06 | 277/445 |
| 3,751,047 A * | 8/1973 | McGee | F16J 9/06 | 277/468 |
| 3,751,784 A | 8/1973 | Packard | | |
| 3,909,016 A | 9/1975 | Traub et al. | | |
| 4,252,331 A | 2/1981 | Siegel | | |
| 4,560,174 A | 12/1985 | Bisi | | |
| 4,911,455 A * | 3/1990 | Edlund | F16J 15/3208 | 277/589 |
| 5,082,295 A | 1/1992 | Wetzel | | |
| 5,197,746 A * | 3/1993 | Rehfeld | F16J 9/06 | 277/452 |

(Continued)

*Primary Examiner* — Nicholas L Foster

(74) *Attorney, Agent, or Firm* — Norton Rose Fulbright Canada

(57) ABSTRACT

A cylindrical seal apparatus according to one embodiment includes a split spring ring and a split seal ring supported in a groove for example defined in a piston. The split spring ring in a tensioning condition presses against a tapered annular inner surface of the split seal ring to create a radial pre-load and an axial pre-load to the slit seal ring to establish a primary sealing contact between the seal ring and a cylinder, and a second sealing condition between the seal ring and a lower-pressure side of the groove, before the working fluid pressure is built up.

17 Claims, 4 Drawing Sheets

(56) References Cited

U.S. PATENT DOCUMENTS

| | | | | | |
|---|---|---|---|---|---|
| 5,249,813 | A * | 10/1993 | Botto | F16J 15/3208 | 277/556 |
| 5,253,877 | A * | 10/1993 | DeBiasse | F16J 9/06 | 277/437 |
| 5,607,166 | A * | 3/1997 | Gorman | F16J 15/164 | 277/436 |
| 5,743,535 | A | 4/1998 | Hodgins | | |
| 9,267,441 | B1 * | 2/2016 | Ellwood, III | F04D 29/10 | |

* cited by examiner

DUAL PRE-LOAD CYLINDRICAL SEAL

TECHNICAL FIELD

The application relates generally to seals, and more particularly, to seals having pre-load features.

BACKGROUND OF THE ART

Cylindrical seals are widely used to prevent loss of working fluid pressure and to improve working performance, such as in pistons used in pneumatic and hydraulic systems of gas turbine engines or in other applications such as engine cylinders of internal combustion engines. Conventional cylindrical seals such as piston ring seal designs typically include the use of a piston ring as a seal in reciprocating, rotating and static conditions. The simplest form of a conventional piston ring has a rectangular cross-section with a primary sealing contact between an outer-diameter surface of the ring and an inner surface of a cylinder, and a secondary sealing contact between a side of the ring and a lower pressure side of a groove in which the ring is supported. The primary sealing contact between the outer-diameter surface and the inner surface of the cylinder is established when the ring is installed and is maintained by a pre-tension of the piston seal ring. The secondary sealing contact, however, cannot be achieved until a working fluid pressure is built up in the cylinder causing leakage around the sides and the inner-diameter surface of the ring. The flow of working fluid through the small clearances around the ring causes a pressure drop across the ring. The unbalanced force seats the ring against the lower pressure side of the groove and therefore establishes the secondary sealing contact. However, the secondary sealing method can lead to sealing variability and undesirable, inconsistent system response. Furthermore, conventional piston seal rings have a split end geometry that allows a leakage path in the radial direction. The leakage is usually minimized by a second piston seal ring positioned against the inner-diameter surface of the first piston seal ring such that the second piston seal ring blocks the end gap opening of the first piston seal ring. Care is required during installation to ensure the end gaps of the two piston seal rings are about 180 degrees apart.

Accordingly, improved cylindrical sealing is needed.

SUMMARY

In one aspect, there is provided a seal for a first cylindrical component telescopically adjacent a second cylindrical component, the first cylindrical component having a circumferential groove with opposite side walls defined therein for receiving the seal, the groove being open toward a cylindrical surface of the second cylindrical component, the seal comprising: a split spring ring having two ends; and a split seal ring having two ends, the split seal ring defining substantially annular first and second opposed radial surfaces, a substantially cylindrical surface extending axially between the first and second radial surfaces, and a tapered annular surface extending between the first and second radial surfaces at an oblique angle with respect to a central axis of the split seal ring, wherein the split spring ring and the split seal ring are configured to be located in and supported within said groove defined in the first component, the split spring ring pressing against the tapered annular surface of the split seal ring, the substantially cylindrical surface of the split seal ring being pressed radially against and in a sealing contact with the cylindrical surface of the second component by a radial pre load, and one of the first and second radial surfaces of the split seal ring being pressed axially against and in a sealing contact with one of the side walls of the groove by an axial pre load.

In another aspect, there is provided a sealed assembly comprising: a first cylindrical component telescopically adjacent a second cylindrical component; a split spring ring having two ends; a split seal ring having two ends, the split seal ring defining substantially annular first and second radial surfaces facing away from each other, a substantially cylindrical surface extending axially between the first and second radial surfaces, and a tapered annular surface extending between the first and second radial surfaces at an oblique angle with respect to a central axis of the split seal ring; and wherein the split spring ring and the split seal ring are supported in an groove defined in a first component, the groove being open toward a cylindrical surface of a second component, the groove defining opposite side walls, the split spring ring being pre loaded under a tensioning condition to press against the tapered annular surface of the split seal ring, the substantially cylindrical surface of the split seal ring being pressed radially against and in a sealing contact with the cylindrical surface of the second component by a radial pre load, and one of the first and second radial surfaces of the split seal ring being pressed axially against and in a sealing contact with one of the side walls of the groove by an axial pre load.

In a further aspect, there is provided a sealed assembly comprising: a cylinder and piston movable in said cylinder; a split spring ring having two ends; a split seal ring having two ends, the split seal ring defining substantially annular first and second radial surfaces facing away from each other, an outer diameter surface extending axially between the first and second radial surfaces, and an inner diameter surface extending between the first and second radial surfaces at an oblique angle with respect to a central axis of the split seal ring; and wherein the split spring ring and the split seal ring are supported between opposite side walls of a groove defined in the piston, the groove being open toward an inner surface of the cylinder, the split spring ring being pre loaded in a tensioning condition to press against the inner diameter surface of the split seal ring, the outer diameter surface of the split seal ring being pressed radially outwardly against and in a sealing contact with the inner surface of the cylinder by a radial pre load, and one of the first and second radial surfaces of the split seal ring being pressed axially against and in a sealing contact with one of the side walls of the groove by an axial pre load.

DESCRIPTION OF THE DRAWINGS

Reference is now made to the accompanying drawings in which.

It will be noted that throughout the appended drawings, like features are identified by like reference numerals.

The terms "axial" and "radial" used for various components below are defined with respect to a central axis of a the seal ring, spring ring and/or cylinder, shown in FIGS. 1, 3, 4 and 7.

DETAILED DESCRIPTION

Figure 1:
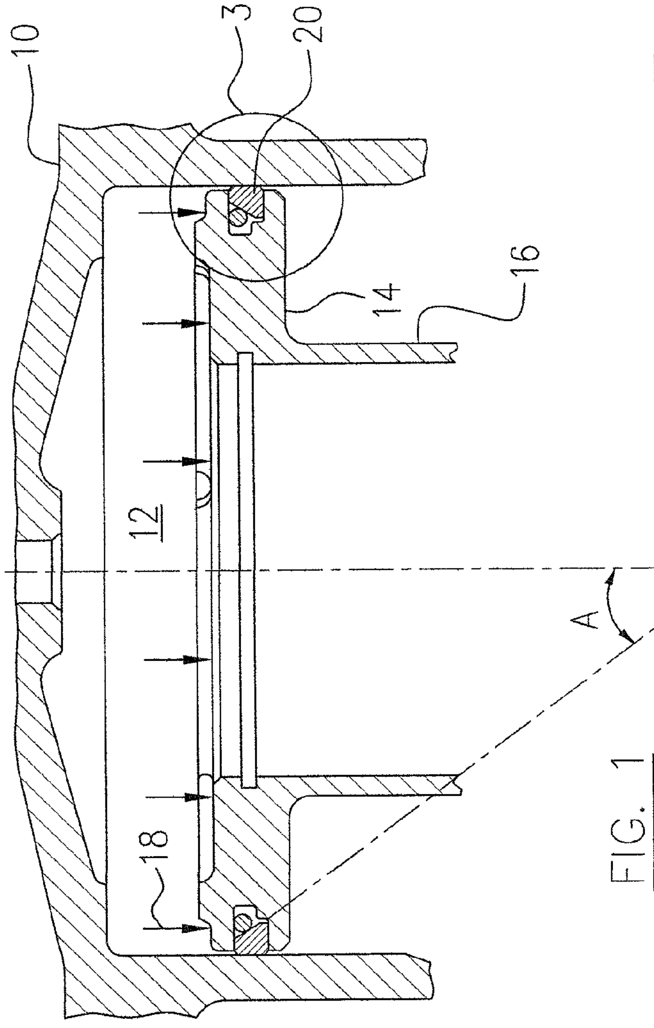
FIG. 1 is a partial cross-sectional view of a cylinder as an example to illustrate a cylindrical seal apparatus according to one embodiment.

Referring to FIG. 1, a cylindrical device which can be widely used in gas turbine engines or other machines such as actuators, may include a cylinder 10 having a cylinder chamber 12 and a piston 14 axially moveable within the chamber 12 of the cylinder 10. The piston 14 may be firmly fixed to a piston rod 16 which may be connected to an external device (not shown). Under a working fluid pressure as indicated by arrows 18, the piston 14 together with the piston rod 16 may be pushed to overcome a spring force (not indicated) applied, for example by a coil spring (not shown) and to move axially from a first end of the cylinder chamber 12 to a second end thereof, thereby actuating the external device. When the working fluid pressure 18 is withdrawn, the piston 14 together with the piston rod 16 will return from the second end to the first end under the spring force.

In order to establish the working fluid pressure 18 in the cylinder chamber 12 at one side of the piston 14, a cylindrical seal apparatus 20 is provided in order to form a sealed assembly of the cylinder and piston. The working fluid may be air, oil or other fluids used in pneumatic, hydraulic or other applications.

Figure 2:
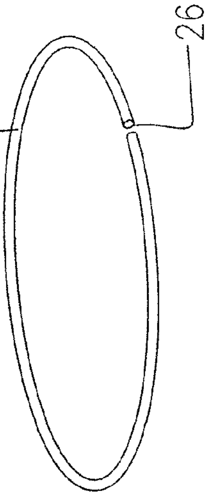
FIG. 2 is a split spring ring used in the cylindrical seal apparatus of FIG. 1.
Figure 3:
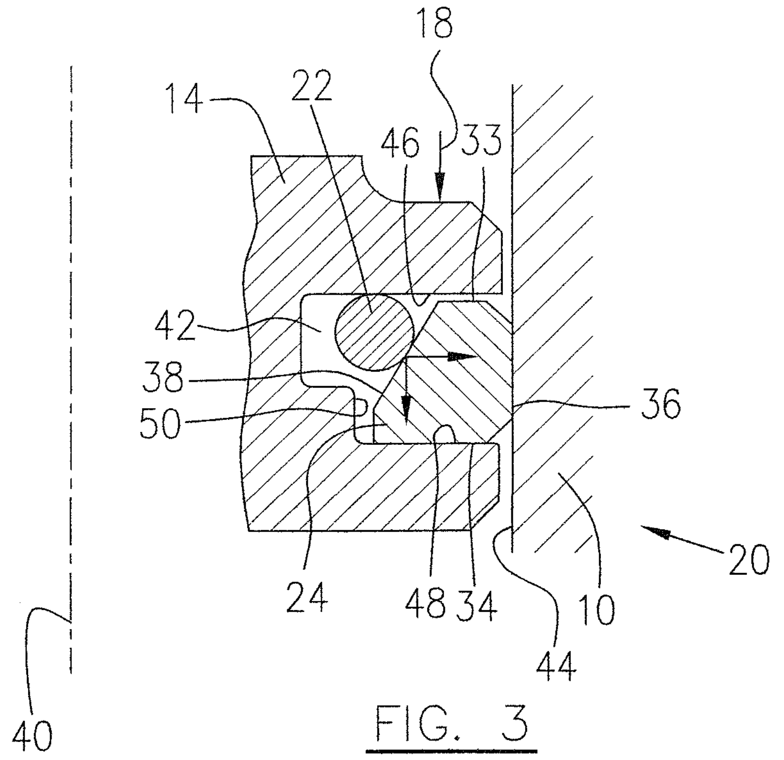
FIG. 3 is a partial cross-sectional view of the cylindrical seal apparatus which is in a circle indicated by numeral 3 in FIG. 1, showing the details of the cylindrical seal apparatus in an enlarged scale.

Referring to FIGS. 1-3, the cylindrical seal apparatus 20 may include a split spring ring 22 and a split seal ring 24. The split spring ring 22 according to one embodiment may be made of a metal material and may have two free ends (not numbered) to define a circumferential gap 26 therebetween. Therefore, the split spring ring 22 may have a resilient structural property and may have a rigid cross-section which cannot be deformed under a pressed condition. The split spring ring 22 may be pre-loaded by a radial external force to adjust the size of the circumferential gap 26 and thus the diameter of the split spring ring 22, which results in a pre-tensioning condition. Under such a pre-tensioning condition the split spring ring 22 may have a tendency to return to its original diameter, thereby creating a pre-load on an annular surface of a component such as the split seal ring 24 which restricts the split spring ring 22 from returning to its original diameter.

Referring to FIGS. 1 and 3-6, the split seal ring 24 may have two ends 28, 30 (see FIGS. 5 and 6) which are free in movement relative to each other and define a pair of overlapping surfaces 32. The split seal ring 24 may be made from metal or a suitable material which provides resilient properties to the split seal ring structure and also provides a rigid un-deformable cross-section of the split seal ring 24. The split seal ring 24 according to one embodiment may define substantially annular first and second radial surfaces 33, 34 at opposite sides of the split seal ring 24 and facing away from each other. A substantially cylindrical outer-diameter surface 36 may extend axially between the first and second radial surfaces 33, 34 and a tapered annular inner-diameter surface 38 (see FIG. 3) may extend between the first and second radial surfaces 33, 34 at an oblique angle A (see FIG. 1) with respect to a central axis 40 of the split seal ring 24. It should be noted that the central axis 40 of the split seal ring 24 may be substantially co-axial with the respective central axis of the cylinder 10, piston 14 and piston rod 16.

An annular groove 42 may be defined in the piston 14 and may be open toward an annular inner surface 44 of the cylinder 10. The groove 42 may have opposite side walls 46, 48 to define a width therebetween slightly greater than the axial thickness of the split seal ring 24 between the radial surfaces 33, 34.

The split spring ring 22 and the split seal ring 24 may be received in the annular groove 42, and may be supported between the opposite side walls 46 and 48 of the groove 42.

The split spring ring 22 and the split seal ring 24 may be configured to have a respective radial dimension such that the split spring ring 22 may be restricted between the tapered annular inner-diameter surface 38 of the split seal ring 24 and the side wall 46 of the groove 42 to create a tensioning condition and thus a pre-load of the split spring ring 22. Under such a tensioning condition, the split spring ring 22 presses against the tapered annular inner-diameter surface 38 of the split seal ring 24, resulting in a radial pre-load component and an axial pre-load component (as shown by the un-numbered arrows in FIG. 3) to the split seal ring 24. Under such radial and axial pre-load components, the substantially cylindrical outer-diameter surface 36 of the split seal ring 24 is pressed radially outwardly against and is in a primary sealing contact with the annular inner surface 44 of the cylinder 10, and the second radial surface 34 of the split seal ring 24 which has a radial dimension greater than the radial dimension of the first radial surface 33 of the split seal ring 24, is pressed against and is in a secondary sealing contact with the corresponding side wall 48 of the groove 42.

The split spring ring 22 may be free of contact with the bottom (not numbered) of the groove 42 to allow adjustment of the diameter of the split spring ring 22 in order to create and maintain the pre-tensioning condition.

It should be noted that such a primary sealing contact between the substantially cylindrical outer diameter surface 36 of the split seal ring 24 and the annular inner surface 44 of the cylinder 10 together with the secondary sealing contact between the second radial surface 34 of the split seal ring 24 and the side wall 48 of the groove 42, can be established by the dual pre-load components applied to the split seal ring 24 by the split spring ring 22, prior to the establishment of working fluid pressure 18 (see FIG. 1). This may effectively prevent working fluid leakage around the split seal ring 24 when the working fluid begins to enter the chamber 12 of the cylinder 10. Therefore, the sealing contacts, particularly the secondary sealing contact, may be achieved much easier due to the mechanical pre-load, particularly the mechanical axial pre-load which will significantly reduce undesirable sealing variability due to seal movement or uneven face contact which both result in inconsistent system responses. As the working fluid pressure 18 builds up, the working fluid pressure 18 takes over from the pre-loading as the predominant sealing force.

Angle A in FIG. 1 may vary depending on mechanical axial and radial pre-loading requirements. According to one embodiment, angle A may be defined between 15 and 45 degrees. Angle A equal to or greater than 15 degrees may be optional in order to provide enough axial forces for the secondary sealing contact. More radial forces may be required for the primary sealing contact and thus it may be optional to have angle A equal to or smaller than 45 degrees.

It should be noted that during assembly, the split seal ring 24 should be correctly positioned in the groove 42 such that the direction of the axial pre-load component is in accordance with the direction of the working fluid pressure 18, or the direction of a working fluid pressure differential (not indicated) across the split seal ring 24, as shown in FIG. 3.

The groove 42 according to one embodiment, may be configured to have a varying depth in a cross section thereof. For example, the groove 42 may be configured to have a circumferentially extending step 50 on the bottom of the groove 42 which may be located adjacent to the side wall 48 which is a lower pressure side of the groove 42 and is also in the secondary sealing contact with the second radial surface 34 of the split seal ring 24.

Such a configuration may provide a guided installation of the split spring ring 22 and the split seal ring 34 in the groove 42, in which the axial pre-load component direction is always in accordance with the direction of the pressure differential across the split seal ring 24 or in accordance with the direction of the working fluid pressure 18.

Figure 7:
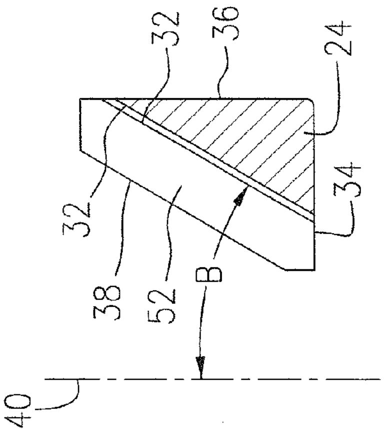
FIG. 7 is a cross-sectional view of the piston seal ring taken along line 7-7 in FIG. 5, showing an upper sub-gap between the two overlapping ends of the piston seal ring.

Referring to FIGS. 3, 5-8, the pair of overlapping surfaces 32 of the respective ends 28, 30 of the split seal ring 24 may extend at an oblique angle B with respect to the central axis 40 of the split seal ring 24 (see FIG. 7). For example, the pair of overlapping surfaces 32 may extend between the substantially cylindrical outer-diameter surface 36 of the split seal ring 24 and the second radial surface 34 of the split seal ring 24 which is pressed axially against the side wall 48 of the groove 42, at an angle B which may be equal to or different from angle A in FIG. 1. In such a configuration, the pair of overlapping surfaces 32 divide a circumferential gap between the ends 28, 30 of the split seal ring 24, into upper and lower sub-gaps 52, 54. Due to the angled orientation of the overlapping surfaces 32, the openings of the respective sub-gaps 52, 54, particularly those open towards the annular inner surface 44 (primary sealing surface) of the cylinder 10 and the side wall 48 (secondary sealing surface) of the groove 42 (see FIG. 3) will be substantially blocked, resulting in a significant reduction in working fluid leakage across the split seal ring 24 in the radial direction, without the need of a conventional second seal.

Figure 10:
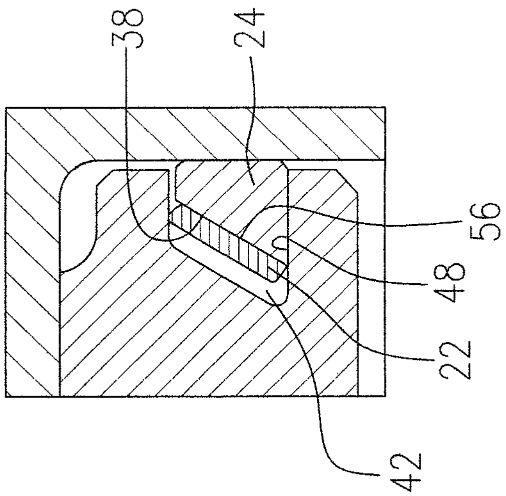
FIG. 10 is a cross-sectional view of the cylindrical seal apparatus of FIG. 9.
Figure 9:
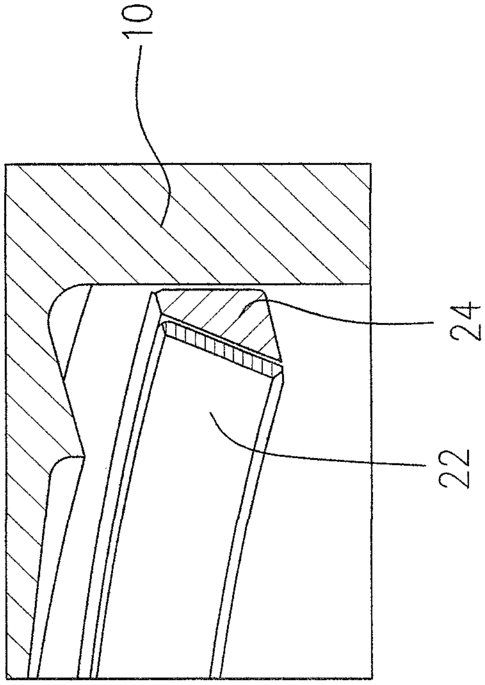
FIG. 9 is a partial perspective view of the cylindrical seal apparatus of FIG. 1 according to another embodiment.

Referring to FIGS. 9 and 10, the split spring ring 22 may be configured to have a tapered annular outer-diameter surface 56 having a conical angle equal to the angle A (see FIG. 1) with respect to the central axis 40 of the split spring ring 22 which is also the central axis of the split seal ring 24. Therefore, the tapered annular outer-diameter surface 56 of the split spring ring 22 and the tapered annular inner-diameter surface 38 of the split seal ring 24 are in full contact when the split spring ring 22 is pre-loaded in the tensioning condition, as a result of being radially restricted by the split seal ring 24 and being axially restricted within the groove 42.

Optionally, the split spring ring 22 may have a substantially rectangular cross-section and the groove 42 may be configured to have a varying depth. For example, the bottom of the groove 42 may extend at an oblique angle with respect to the lower pressure side wall 48 of the groove 42 which forms the secondary sealing surface, in order to provide the guided positioning of the split spring ring 22 and the split seal ring 24 in the groove 42.

Due to the full contact between the tapered annular outer-diameter surface 56 of the split spring ring 22 and the tapered annular inner-diameter surface 38 of the split seal ring 24, the split spring ring 22 according to this embodiment may advantageously provide a seal as effective as a conventional second seal ring, to block the radial leakage between the two ends of the split seal ring 24.

Figure 4:
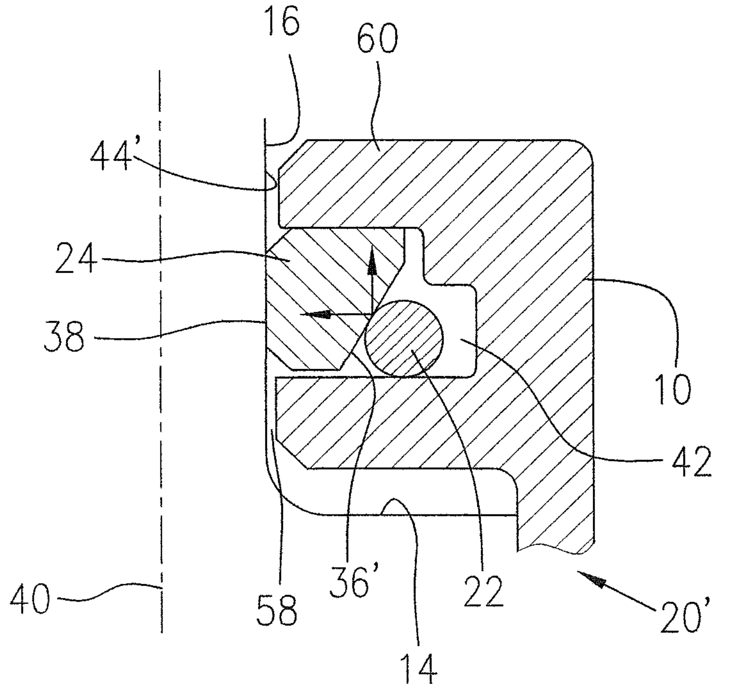
FIG. 4 is a partial cross-sectional view of a cylindrical seal apparatus according to another embodiment.
Figure 6:
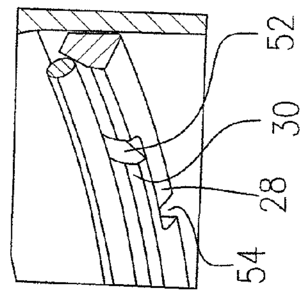
FIG. 6 is a partial perspective view of the cylindrical seal apparatus of FIG. 1, with the piston removed to show the two overlapping ends of the piston seal ring.
Figure 8:
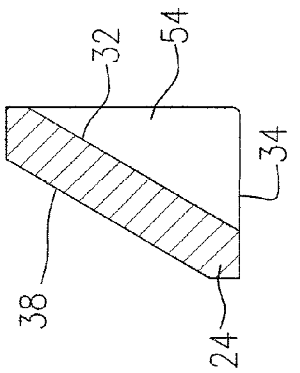
FIG. 8 is a cross-sectional view of the piston seal ring taken along line 8-8 in FIG. 5, showing a lower sub-gap between the two overlapping ends of the piston seal ring.
Figure 5:
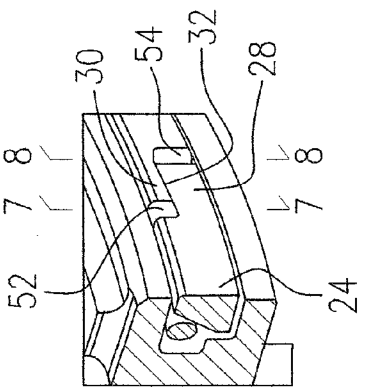
FIG. 5 is a partial perspective view of the cylindrical seal apparatus of FIG. 1 with the cylinder removed to show the two overlapping ends of a piston seal ring.

Referring to FIG. 4, the cylindrical seal apparatus according to one embodiment which is indicated by 20', is similar to the cylindrical seal apparatus 20 of FIG. 1 and may be applicable to provide a cylindrical seal between for example, the piston rod 16 and a bore 58 extending through an end wall 60 of the cylinder 10. In such an application, the split spring ring 22 and the split seal ring 24 are received and supported within the groove 42 defined in the end wall 60 of the cylinder 10. The annular groove 42 is open radially inwardly toward a cylindrical surface 44' of the piston rod 16. It should be noted that the features of the cylindrical seal apparatus 20' are generally similar to the cylindrical seal apparatus 20 of FIG. 1, except for the following: the split seal ring 24 of the cylindrical seal apparatus 20' may have its inner-diameter surface 38' as the cylindrical primary sealing surface and its outer-diameter surface 36' as the tapered annular surface to be pressed by the split spring ring 22. Other similar features will not be repeated herein.

The cylindrical seal apparatuses 20, 20' provide dual direction loading to mechanically establish both a primary and secondary sealing contact. Pre-loading in the axial direction will establish the secondary sealing contact under static conditions whereas conventional methods require a working fluid pressure buildup in order to establish the end face sealing of the split seal ring 24. Providing an initial end face seal of the split seal ring 24 under static conditions reduces the undesirable sealing variability associated with piston movement or uneven face contact. The split spring ring 22 of these embodiments may also be self-adjusting as it will continue to slide up the seal wedge of the split seal ring 24 to compensate for any wear to the split seal ring 24 during operation. This will ensure consistent sealing, even as the split seal ring 24 wears over time. Furthermore, the cylindrical seal apparatus 20, 20' may be adjusted to vary radial and axial loads by modifying the geometry and material of the split spring ring 22 and the split seal ring 24. It should be noted that a split spring ring 22 having a circular cross-section can be produced at a low cost due to the simple nature of the design rather than a costly rectangular cross-section that requires precision machining.

The above description is meant to be exemplary only, and one skilled in the art will recognize that changes may be made to the embodiments described without departing from the scope of the described subject matter. The described subject matter is applicable not only as a piston seal or a piston rod seal, but also as a cylindrical seal apparatus used in various applications. Modifications which fall within the scope of the described subject matter will be apparent to those skilled in the art, in light of a review of this disclosure, and such modifications are intended to fall within the appended claims.

The invention claimed is:

1. A sealed assembly comprising:

a first cylindrical component telescopically adjacent a second cylindrical component, one of the first and second cylindrical components defining a chamber in which the other of the first and second cylindrical components is axially moveable;

a working fluid received in the chamber, the working fluid for creating a working fluid pressure on the other of the first and second cylindrical components to axially move the other of the first and second cylindrical component;

a split spring ring having two ends;

a split seal ring having two ends, the split seal ring defining substantially annular first and second radial surfaces facing away from each other, a substantially cylindrical surface extending axially between the first and second radial surfaces, and a tapered annular surface extending between the first and second radial surfaces at an oblique angle with respect to a central axis of the split seal ring; and wherein the split spring ring and the split seal ring are supported in a groove defined in the first cylindrical component, the groove being open toward a cylindrical surface of the second cylindrical component, the groove defining opposite side walls, the split spring ring slidingly received against the tapered annular surface of the split seal ring, the split spring ring being pre-loaded under a tensioning condition to create a radial pre-load and an axial pre-load on the split seal ring by pressing against the tapered annular surface of the split seal ring, the substantially cylindrical surface of the split seal ring being pressed radially against and in a sealing contact with the cylindrical surface of the second component by the radial pre-load, and the first radial surface of the split seal ring being pressed axially against and in a sealing contact with one of the side walls of the groove by the axial pre-load, the second radial surface and the tapered annular surface of the split seal ring being in fluid communication with the chamber so that upon creation of the working fluid pressure in the chamber, the working fluid pressure acts on the tapered annular surface in a direction of the axial pre-load and the working fluid pressure takes over from the axial pre-load as a predominant sealing force on the split seal ring.

2. The sealed assembly as defined in claim 1 wherein the substantially cylindrical surface of the split seal ring defines an outer diameter surface of the split seal ring and wherein the tapered annular surface of the split seal ring defines an inner diameter surface of the split seal ring.

3. The sealed assembly as defined in claim 2 wherein the first component comprises a piston and the second component comprises a cylinder defining the chamber in which the piston is moveably received.

4. The sealed assembly as defined in claim 1 wherein the substantially cylindrical surface of the split seal ring defines an inner diameter surface of the split seal ring and wherein the tapered annular surface of the split seal ring defines an outer diameter surface of the split seal ring.

5. The sealed assembly as defined in claim 4 wherein the first component comprises a cylinder defining the chamber and having a bore extending through an end wall of the cylinder, said groove being defined in the bore and wherein the second component comprises a piston rod which moveably extends through the bore of the cylinder.

6. The sealed assembly as defined in claim 1 wherein the groove is configured to limit the split spring ring and split seal ring within the groove such that the direction of the axial pre load created on the split seal ring is determined by a cross sectional configuration of the groove.

7. The sealed assembly as defined in claim 1 wherein the groove comprises a step on a bottom of the groove at one of the first and second side walls, resulting in a first groove depth being different from a second groove depth.

8. The sealed assembly as defined in claim 1 wherein the groove comprises a surface extending between the opposite side walls at an oblique angle with respect to the central axis of the split seal ring.

9. The sealed assembly as defined in claim 1 wherein the groove comprises a surface extending between the opposite side walls, the surface free of contact with the split spring ring.

10. The sealed assembly as defined in claim 1 wherein the two ends of the split seal ring overlap each other, defining overlapping surfaces extending at an oblique angle with respect to the central axis of the split seal ring.

11. The sealed assembly as defined in claim 1 wherein the angle at which the tapered annular surface extends between the first and second radial surfaces with respect to the central axis of the split seal ring, is between 15 and 45 degrees.

12. A sealed assembly comprising:

a cylinder and piston movable in a chamber of said cylinder;

a working fluid received in the chamber, the working fluid for creating a working fluid pressure on the cylinder to axially move the cylinder;

a split spring ring having two ends;

a split seal ring having two ends, the split seal ring defining substantially annular first and second radial surfaces facing away from each other, an outer diameter surface extending axially between the first and second radial surfaces, and an inner diameter surface extending between the first and second radial surfaces at an oblique angle with respect to a central axis of the split seal ring; and wherein the split spring ring and the split seal ring are supported between opposite side walls of a groove defined in the piston, the split spring ring slidingly received against the inner diameter surface of the split seal ring, the groove being open toward an inner surface of the cylinder, the split spring ring being pre-loaded in a tensioning condition to create a radial pre-load and an axial pre-load on the split seal ring by pressing against the inner diameter surface of the split seal ring, the outer diameter surface of the split seal ring being pressed radially outwardly against and in a sealing contact with the inner surface of the cylinder by the radial pre-load, and the first radial surface of the split seal ring being pressed axially against and in a sealing contact with one of the side walls of the groove by the axial pre-load, the second radial surface and the inner diameter annular surface of the split seal ring being in fluid communication with the chamber so that upon creation of the working fluid pressure in the chamber, the working fluid pressure acts on the inner diameter annular surface in a direction of the axial pre-load and the working fluid pressure takes over from the axial pre-load as a predominant sealing force on the split seal ring.

13. The sealed assembly as defined in claim 12 where the split spring ring comprises a tapered annular surface in full contact with the inner diameter surface of the split seal ring.

14. The sealed assembly as defined in claim 12 wherein the split spring ring is free of contact with a surface of the groove extending between the opposite side walls.

15. The sealed assembly as defined in claim 12 wherein the groove is configured to have a varying depth in a cross section of the groove, resulting in guided positioning of the split spring ring and split seal ring to create said axial pre load in a direction of a pressure differential of a working fluid cross the piston during piston operation in the cylinder.

16. The sealed assembly as defined in claim 12 wherein the two ends of the split seal ring comprise a pair of overlapping surfaces extending at an oblique angle with respect to the central axis of the split seal ring.

17. The sealed assembly as defined in claim 12 wherein the two ends of the split seal ring comprise a pair of overlapping surfaces extending between the outer diameter surface of the split seal ring and the first radial surface.

* * * * *